(12) United States Patent
Clauson

(10) Patent No.: US 7,101,307 B2
(45) Date of Patent: Sep. 5, 2006

(54) METHODS AND DEVICES FOR ALTERING THE TRANSMISSION RATIO OF A DRIVE SYSTEM

(75) Inventor: Luke W. Clauson, 950 Redwood Shores #H101, Redwood Shores, CA (US) 94065

(73) Assignee: Luke W. Clauson, Menlo Park, CA (US)

( * ) Notice: Subject to any disclaimer, the term of this patent is extended or adjusted under 35 U.S.C. 154(b) by 0 days.

(21) Appl. No.: 10/619,751

(22) Filed: Jul. 14, 2003

(65) Prior Publication Data
US 2005/0014600 A1 Jan. 20, 2005

(51) Int. Cl.
*B60K 5/08* (2006.01)
*B60K 1/00* (2006.01)
*B60K 6/00* (2006.01)

(52) U.S. Cl. ............... 477/2; 475/4; 475/5; 180/65.2; 903/942

(58) Field of Classification Search ............... 477/2, 477/15; 475/4, 5; 180/65.2, 65.3; 903/942, 903/910
See application file for complete search history.

(56) References Cited

U.S. PATENT DOCUMENTS

| 1,870,076 | A | * | 8/1932 | Thomson ............... 318/13 |
| 4,165,795 | A | * | 8/1979 | Lynch et al. .......... 180/65.2 |
| 5,343,970 | A | * | 9/1994 | Severinsky ........... 180/65.2 |
| 5,935,035 | A | * | 8/1999 | Schmidt ................ 475/5 |
| 5,980,410 | A | * | 11/1999 | Stemler et al. ......... 475/5 |
| 6,018,198 | A | * | 1/2000 | Tsuzuki et al. ........ 290/17 |
| 6,110,066 | A | | 8/2000 | Nedungadi et al. |
| 6,455,947 | B1 | | 9/2002 | Lilley et al. |
| 6,540,631 | B1 | * | 4/2003 | Holmes .................. 475/5 |
| 6,558,283 | B1 | * | 5/2003 | Schnelle ................ 475/5 |
| 6,732,526 | B1 | * | 5/2004 | Minagawa et al. .... 60/706 |
| 2003/0078134 | A1 | * | 4/2003 | Kojima et al. ......... 477/3 |
| 2004/0043856 | A1 | * | 3/2004 | Xiaolan ................. 475/5 |

* cited by examiner

*Primary Examiner*—Tisha Lewis
(74) *Attorney, Agent, or Firm*—Jens E. Hoekendijk

(57) ABSTRACT

The transmission ratio between a first motor and an output shaft is varied by changing the speed of a second motor. The first and second motors are coupled to the output shaft with a planetary gear set. The first and second motors may both add power to the drive system.

46 Claims, 6 Drawing Sheets

METHODS AND DEVICES FOR ALTERING THE TRANSMISSION RATIO OF A DRIVE SYSTEM

BACKGROUND

The present invention is directed to devices and methods of adjusting the transmission ratio (speed ratio) between a motor output and a transmission output shaft. Various methods of varying the transmission ratio have been described in the past. Many prior art systems use pulleys and/or belts to provide a continuously variable transmission. These systems have inherent mechanical inefficiencies as well as parts, such as belts, which tend to wear and may require one or more replacements during the life of the system.

The present invention is also directed to methods and systems for combining the power of two or more motors. The combination of power may be used to perform any type of work. The present invention may be used in systems which typically have only one motor and, of course, has obvious applications for systems having two motors such as so-called hybrid vehicles. The present invention is particularly advantageous when combining the power of a heat engine, such as an internal combustion engine, with the power of an electrical motor.

The present invention is also directed to methods of controlling the operation of two motors. In particular, the present invention is directed to increased efficiency and/or increased performance.

SUMMARY

The present invention provides methods and devices for varying the transmission ratio between a first motor and an output shaft. A drive system is provided which has a first motor, a second motor, an output shaft and a control system which controls operation of the first and second motors. In one aspect of the present invention, a planetary gear set is provided which has a ring gear, a sun gear and a carrier which supports at least one planet gear. The first and second motors and the output shaft are each coupled to one of the ring gear, sun gear and carrier.

The transmission ratio between the first motor and the output shaft may be varied by varying the speed of the second motor. The output shaft speed may increase as the speed of the second motor increases while the speed of the first motor is held constant. The control system may select the transmission ratio dependent upon operator input, a desired output torque, power and/or load demand on the output shaft.

In another aspect of the present invention, the first motor is operated in a desired performance range by varying the speed of the second motor thereby varying the transmission ratio between the first motor and the output shaft. For example, the first motor may be operated within a speed range of less than 2000 rpm, or even less than 1000 rpm, while the power output increases at least 50% of a peak power output. In a further aspect, the first and second motors both add power to the output shaft and provide the ability to combine power of the first and second motors when the output shaft is initially not rotating. In yet another aspect, the first and second motors may have a continuous or intermittent power ratings within 20% of one another and even within 10% of one another.

In still another aspect of the present invention, a method of combining the power from the first and second motors is provided. The speed of the second motor is used to change the transmission ratio between the first motor and the output shaft. The first motor is operated in a desired performance range by varying the transmission ratio between the output shaft and the first motor by varying the speed of the second motor. The transmission ratio may be varied in response to a torque or power demand on the output shaft and may be varied in a stepless manner.

In yet another aspect of the present invention, a method of adjusting the transmission ratio of a primary motor is provided. The primary motor is coupled to an output shaft to provide power at the output shaft. The second motor speed is varied to adjust the transmission ratio between the first motor and the output shaft. The second motor speed increases in speed causing the output shaft speed to increase while the primary motor speed is held constant.

DESCRIPTION OF THE PREFERRED EMBODIMENTS

Figure 1:
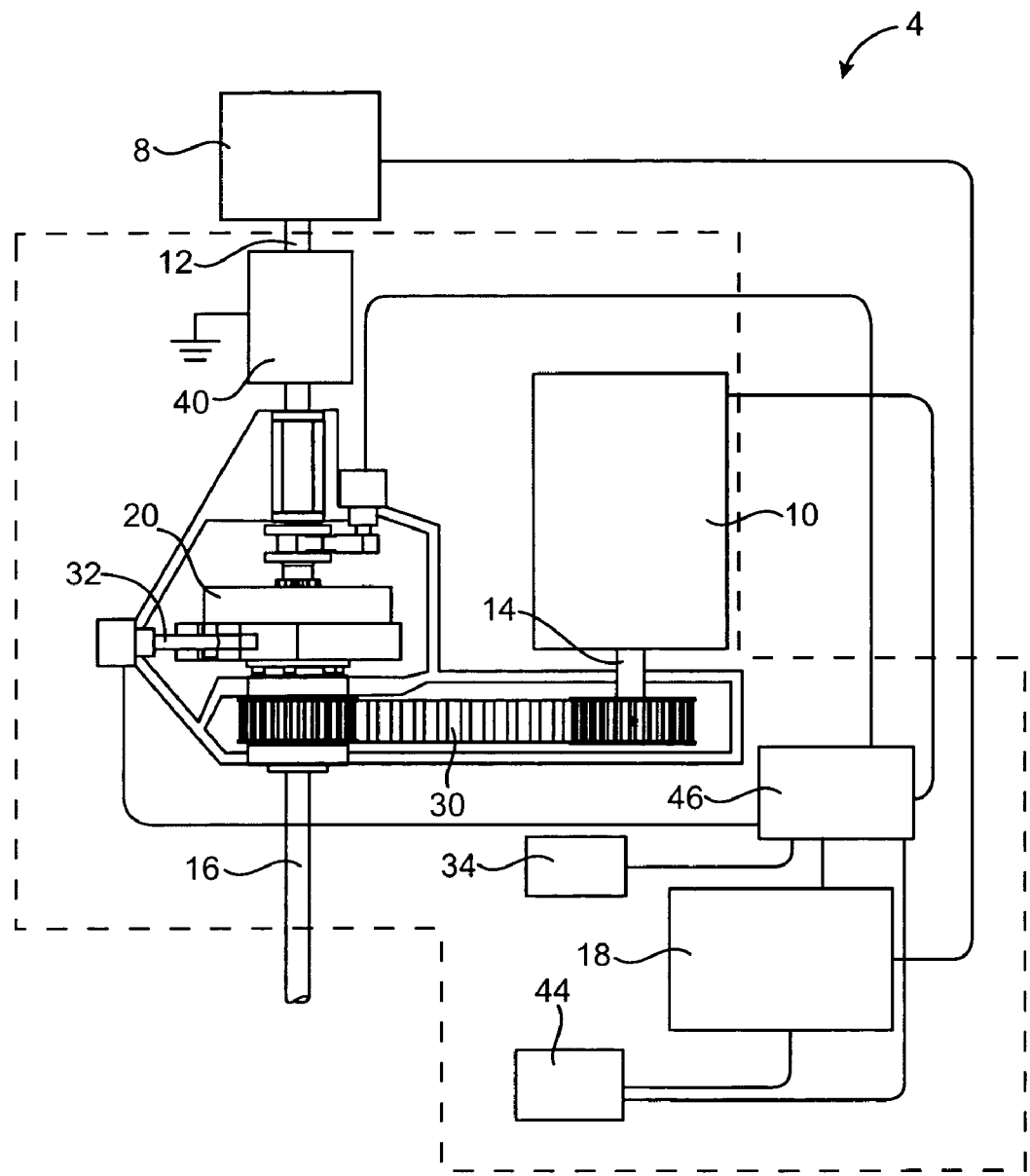
FIG. 1 shows a drive system according to the present invention.

Referring to FIG. 1, a system 2 according to the present invention is shown. The system 2 may be embodied in an engine or a drive system 4 to perform any suitable work or function. For example, the system 2 may be used in a hybrid vehicle although the present invention may be used for any other suitable purpose including applications typically having only one motor. The present invention may be particularly useful in systems with a high inertial load and/or highly variable power requirements. The present invention may also be particularly useful in enhancing the efficiency or power performance of a motor by operating the motor at efficient or otherwise desirable regions within the operating parameters such as peak power output and/or peak efficiency.

The system 2 includes a first motor 8 and a second motor 10. The first and second motors 8, 10 produce rotary output at a first motor output shaft 12 and a second motor output shaft 14. An output shaft 16 is driven by one or both motors 8, 10 as described herein to perform any suitable work. The output shaft 16 may be coupled to a clutch, brake, power transferring elements or other suitable elements within a power transmission system.

A control system 18 is coupled to the first and second motors 8, 10 to control the operation of the motors 8, 10 as described below. As mentioned above, the rotary output may be used to perform any type of work and an example of which is moving a vehicle. Of course, the present invention is useful in many other fields. In particular, the present invention is useful for providing useful work when power requirements vary considerably during operation such as locomotive engines, tractors and cranes to name a few.

Figure 2:
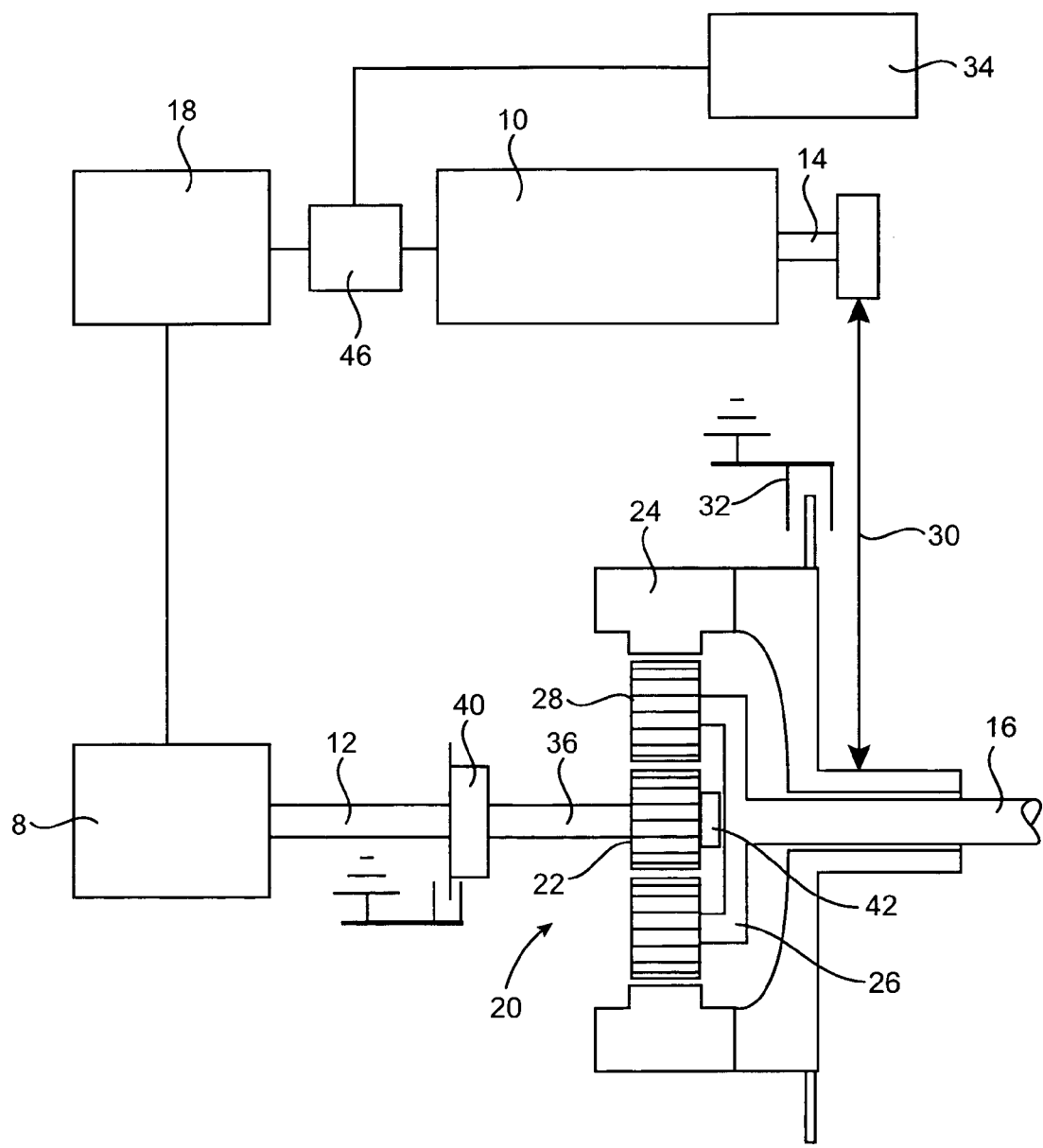
FIG. 2 shows a simplified block diagram showing first and second motors coupled together to produce rotary output at an output shaft.

Referring now to FIG. 2, the first and second motors 8, 10 are coupled together via a planetary gear set 20. The first motor 8 is coupled to a sun gear 22, the second motor 10 is coupled to a ring gear 24, and the output shaft 16 is coupled to a carrier 26 which supports one or more planetary gears 28. The ring gear 24 is in direct communication with the planet gear(s) 28 carried by the carrier 26 and the planet gear 28 is in direct communication with the sun gear 22. The second motor 10 is coupled to the ring gear 24 with a suitable power transmission element 30 such as mating gears, pulleys, a belt or chain. The second motor 10 may also be directly coupled to the shaft of the ring gear 24 by locating it concentric to the ring gear 24.

The direct physical connection and engagement between the sun gear 22, ring gear 24 and carrier 26 provides obvious advantages over systems which require displacement of belts, pulleys, chains or cones which tend to wear and can be relatively expensive. Furthermore, the power transmitting capacity of such systems may not be sufficient for some applications. The direct physical connection between the sun gear 22, ring gear 24 and carrier 26 provides a robust power transmission system as compared to systems which displace or distort or otherwise reposition belts, pulleys, chains or semispherical gears. The spacing or orientation between the shafts also does not change when changing the transmission ratio providing advantages over systems requiring a change in shaft spacing or position. Finally, the gear set of the present invention does not require a change in effective diameter acting on any of the shafts as is the case with some pulley, chain or belt systems which displace or distort the pulley, chain or belt to change the effective diameter acting on one or more shafts. Although the present invention may use belts, pulleys, chains and the like, the present invention does not require a change in the position or orientation of these elements to change the transmission ratio. These elements, if used, would merely be used for power transmission such as from the second motor 10 to the planetary gear set 20 as mentioned above.

The ring gear 24 has a brake 32 which may be used to stop the ring gear 24. The brake 32 mechanically stops and isolates the second motor 10 so that the second motor 10 does not convert energy nor require consumption of energy to stop rotation and hold the gear as in some other systems. Engaging the brake 32 creates a low, discrete speed ratio between the first motor 8 and the output shaft 16. If the second motor 10 is an electric motor, it is an inefficient use of power to slow or keep a shaft from rotation by using it as a brake. Using an electric motor in this manner consumes power but does little or no work. Power conversion for the purpose of electrical braking to attain a specific transmission ratio decreases efficiency by requiring energy without performing work or through energy conversion losses.

Of course, the present invention may be used to operate the second motor 10 as a generator to produce electrical energy to charge a power storage device 34 such as a battery or capacitor, however, such conversions are done only as needed to maintain the power in the power storage device 34 and as directed by the control system 18. Power stored during such cycles would be used for the sake of increased system performance or when it is more efficient to use the stored power than to directly produce power with the first motor 8. The present invention may provide efficient methods of operating the engine or system which may require conversion of rotational energy into electrical energy which is stored by the power storage device 34. The first input shaft 36 may include a clutch/brake assembly 40 to stall its rotation and decouple it from the first motor 8 thereby permitting use of only the second motor 10 to drive the system. The system 2 may also include sensors to transmission control and inverter/drive unit 46.

A synchronizer 42 is provided to directly couple rotation of the first motor output shaft 12 (via the first input shaft 36) to the transmission output shaft 16. The synchronizer 42 may be engaged as necessary and controlled by the control system 18. Engagement of the synchronizer 42 couples the first and second motors 8, 10 together in series to the transmission output shaft 16. In this mode, both motors may add power to the output shaft 16 or the second motor 10 may be intermittently or continuously used as a generator when the second motor 10 is an electric motor/generator. This mode of operation may be used when the speed requirements of the output shaft 16 are relatively narrow or are not changing quickly, such as cruising in a vehicle, or when it is inefficient or impractical to continue to power the second motor 8. The brake 32 may also be applied to isolate the second motor 10 as explained above so that only the first motor 8 drives the output shaft 16. The synchronizer 42 may be any suitable device or structure. For example, the synchronizer 42 may work by sliding the sun gear 22 forward and backward on a splined first input shaft 36. The carrier 26 has a recess 43 into which the sun gear 22 enters and locks when the synchronizer 42 is engaged. When the synchronizer 42 is engaged, the second motor 10 may add no power to the drive system 4, used as a generator to generate electrical energy for storage, or may be used to combine power with the first motor 8 in series as needed.

Figure 3:
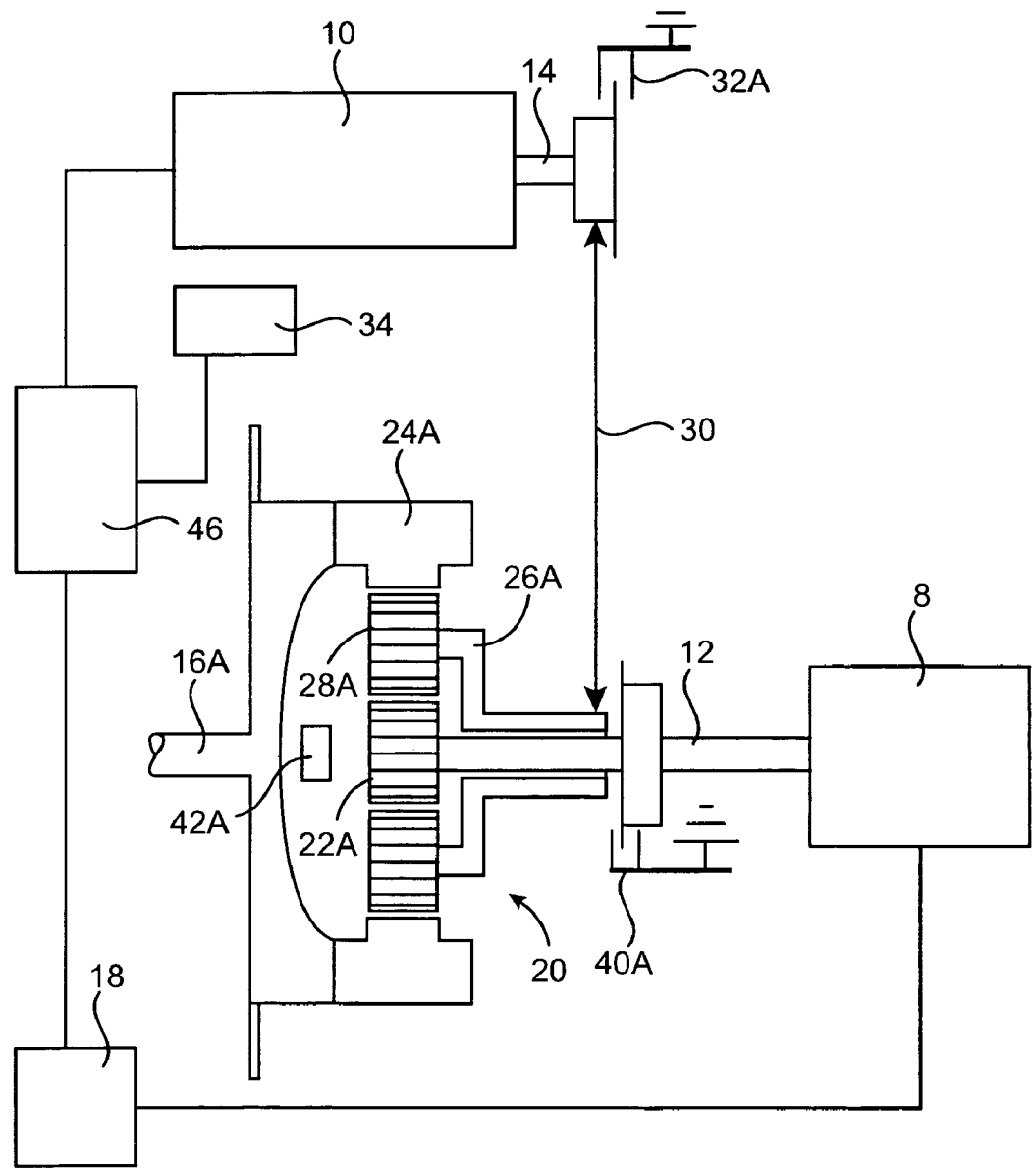
FIG. 3 shows a simplified block diagram of another configuration according to the present invention.
Figure 4:
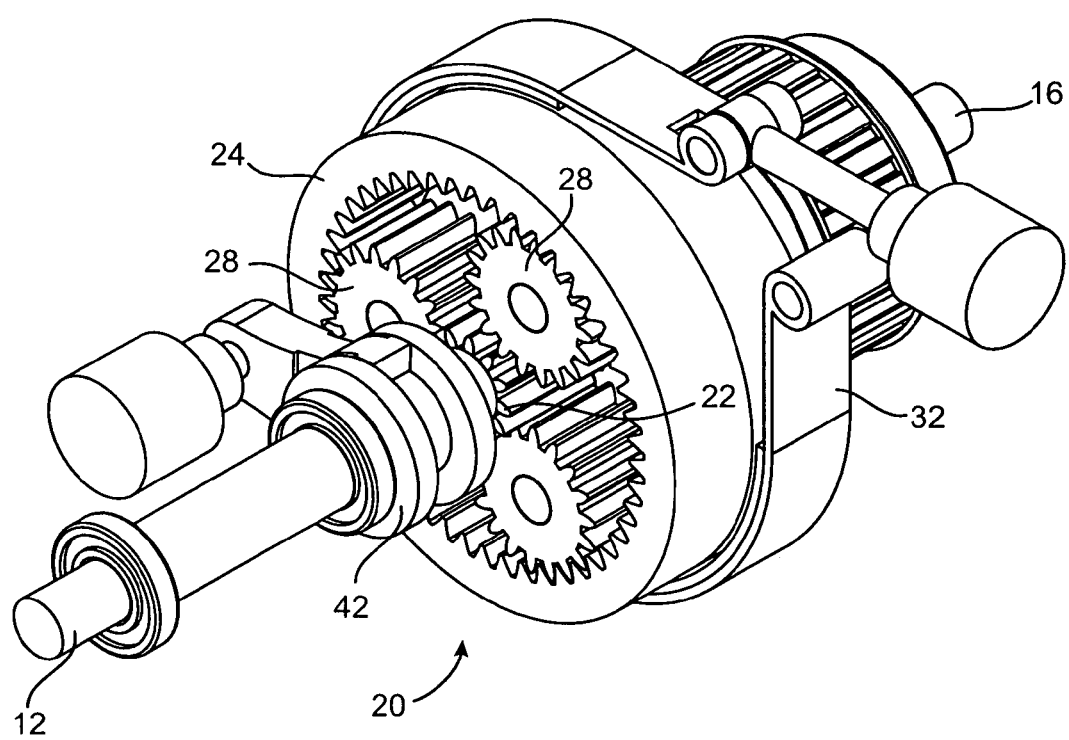
FIG. 4 is an isometric view of a continuously variable transmission of FIG. 2 for varying the transmission ratio between the first motor and the output shaft.
Figure 5:
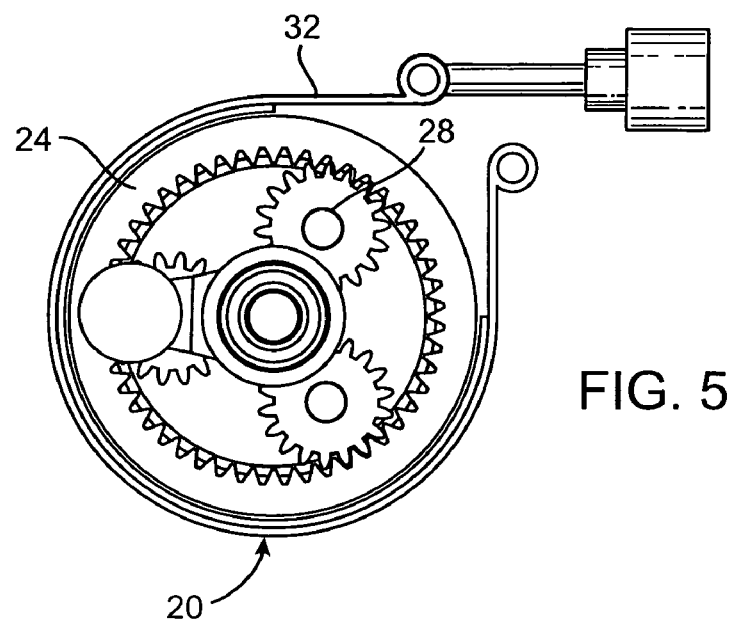
FIG. 5 shows an end view of the continuously variable transmission of FIG. 2.
Figure 6:
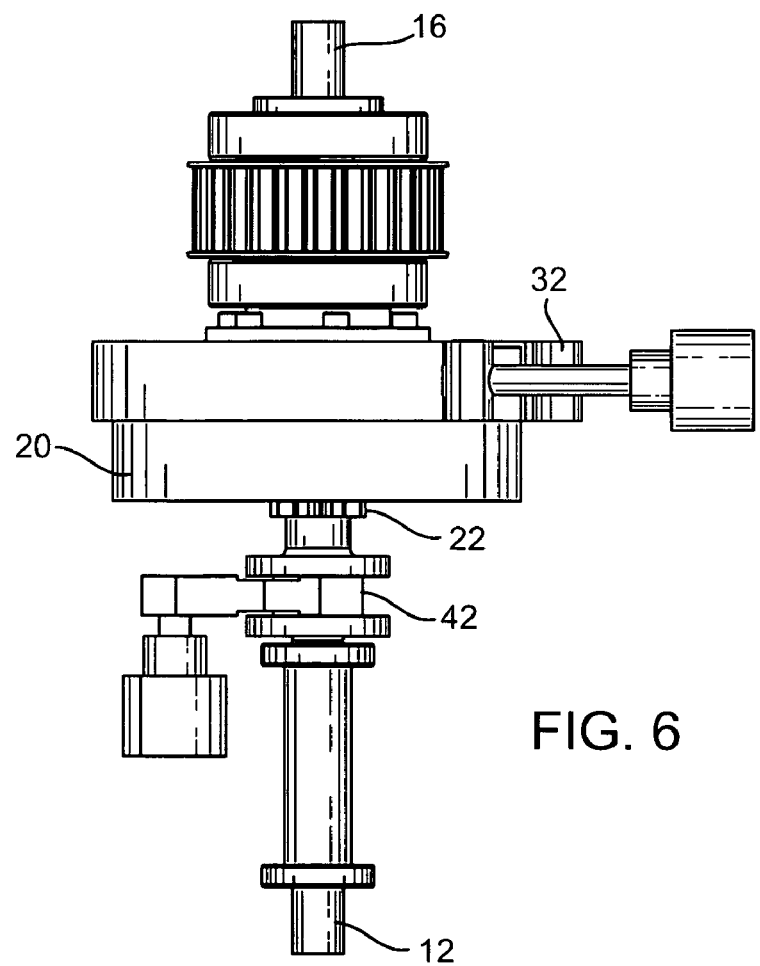
FIG. 6 is a side view of the continuously variable transmission of FIG. 2.
Figure 7:
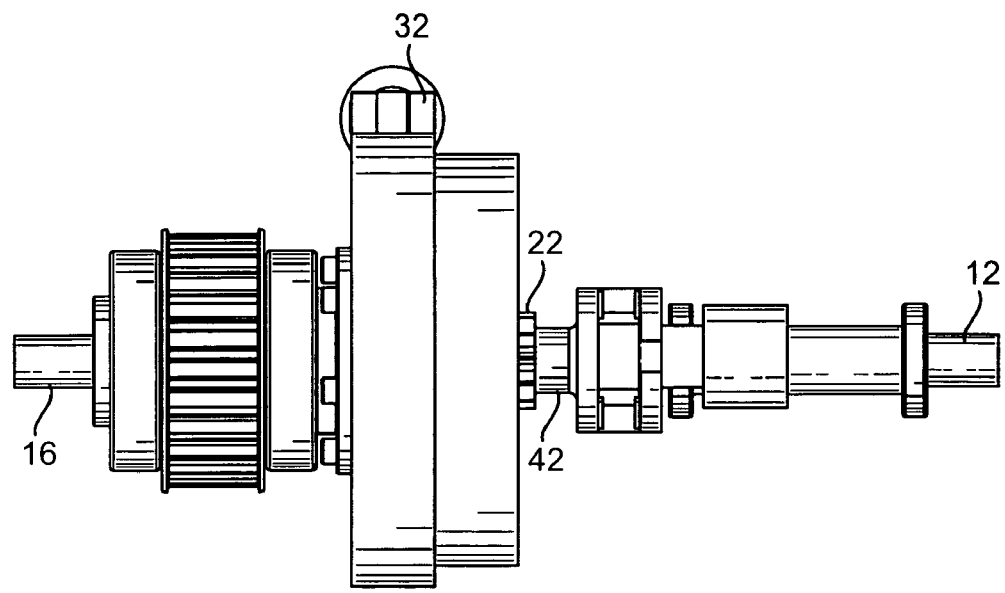
FIG. 7 is another side view of the transmission of FIG. 6
Figure 8:
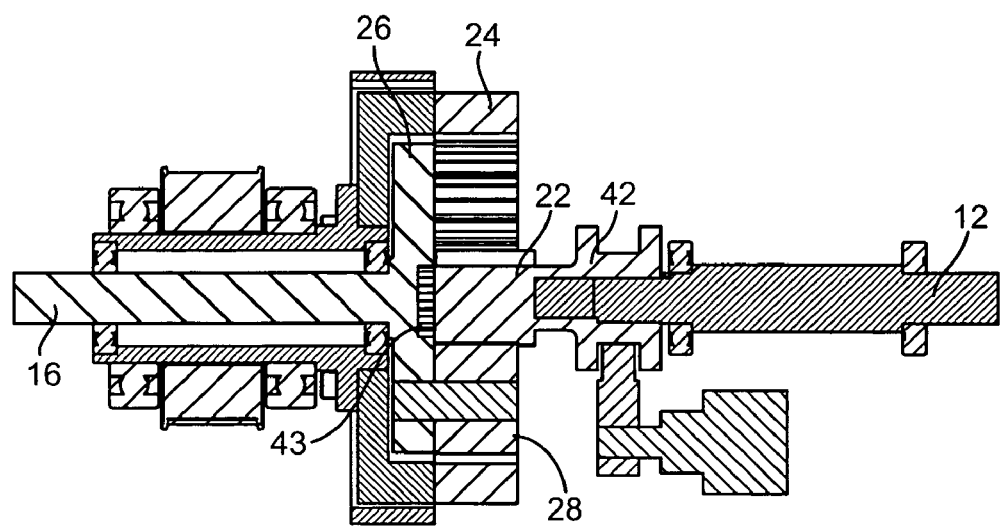
FIG. 8 is a cross-sectional view of the continuously variable transmission of FIG. 2.

Referring to FIG. 3, a schematic diagram of another drive system 4A are shown in which the same or similar reference numbers refer to the same or similar structure. The first motor 8 is coupled to a sun gear 22A, the second motor 10 is coupled to a carrier 26A having at least one planetary gear 28A, and the output shaft 16A coupled to a ring gear 24A. The drive system 4A provides many of the same advantages of the drive system 4 described above and the common aspects and advantages are equally applicable here. For example, the power of the first and second motors 8, 10 is combined while the second motor 10 changes the transmission ratio between the first motor 8 and the output shaft 16A. A brake assembly 32A may be used to stop rotation of the carrier 26A for the same purpose as the brake 32 used above for the ring gear 24. When the brake 32A is applied, the second motor 10 is locked out and all power comes from the first motor 8. A clutch/brake assembly 40A may stop rotation of the sun gear 22A and decouple the first motor 8 from the drive system 4A. The clutch/brake assembly 40A may be used to drive the system 4A with only the second motor 10. A synchronizer 42A is provided to couple the first motor 8 to the output 16A and second motor 10 for the purpose listed above.

Another common feature of the drive systems 4, 4A is that increasing the speed of the second motor 10 increases the speed of the output shaft 16A when the speed of the first motor 8 is held constant. This provides advantages over systems having a negative slope speed curve in which the transmission output shaft speed decreases when one motor increases in speed while the other remains constant. Of course, it can be appreciated that other configurations and gear sets may be used without departing from the scope of the present invention although the preferred embodiments described herein use a planetary gear set 20. The synchronizer 42, 42A also locks and couples the first and second motors 8, 10 to the output shaft 16, 16A as well. Of course, the second motor 10 may be isolated from the system using the brake assembly 32, 32A.

Various modes of operation are now described and it can be appreciated that other modes may be practiced while taking advantage of various aspects of the invention. The modes of operation are equally applicable to both drive systems 4, 4A and discussion of use with drive system 4 below is equally applicable to drive system 4A. The control system 18 is coupled to and controls the operation of the first and second motors 8, 10 as described below. The control system 18 is also coupled to external sensors 44 which monitor various parameters depending upon the particular use. One or both motors 8, 10 may have other components such as a transmission control and/or inverter/drive units 46. These other components may also be coupled to the external sensors 44 for use as is known in various applications of the present invention.

In one mode of operation, the control system adjusts the speed of the second motor 10 to adjust the transmission ratio (speed ratio) between the first motor 8 and the output shaft 16. The transmission ratio may be altered to maintain the first motor 8 within a desired operating range. One such range would be a speed range selected to optimize the performance of the first motor 8. For example, the second motor 10 may be used to adjust the transmission ratio of the first motor 8 so that the first motor 8 operates at or near peak efficiency and/or peak power output while the second motor 10 also adds power to the system. The specific peak power and/or efficiency operation ranges may depend on power requirements determined by external factors such as increasing loads or greater demand by the operator.

The ability to operate the first motor 8 within a desirable performance range provides certain specific advantages when the first motor 8 is an internal combustion engine and the second motor 10 is an electric motor. The efficiency of most internal combustion engines varies significantly over the normal range of operating speeds. The present invention provides the ability to operate the first motor 8 at or near peak efficiency and/or power for a given external load or operator input or demand while combining the power inputs from the first and second motors 8, 10.

The second motor 10 may be used to maintain the first motor 8 in a desired speed or efficiency range in any suitable manner. For example, for a given operator demand, the first motor 8 may vary less than 2000 rpm, less than 1000 rpm or even less than 500 rpm while the drive system 4 power output increases 50% and even 75% of the drive system's 4 peak power output. Stated another way, the second motor 10 is operated to control the transmission ratio between the first motor 8 and the output shaft 16 so that the first motor 8 operates at a speed which depends largely upon the speed of the second motor 10. Of course, the speed of the second motor 10 may be adjusted so that the first motor 8 operates at or near a target speed although even this method will likely lead to small speed variations resulting in a speed range.

While the transmission ratio between the first motor 8 and the output shaft 16 is varied continuously by the action of the second motor 10, the power output of the first motor 8 may also vary from partial to full power while the speed of the first motor 8 is maintained in a relatively tight range. Thus, it can be appreciated that the system of the present invention can continuously and efficiently transmit near peak power levels from the first motor 8 while the output shaft speed 16 increases from zero to the desired operating speed. If there is a change in the load conditions or operator demand the control system 18 may adjust the operation of the motors to efficiently meet the new requirements. For example, the required output torque on the transmission output shaft 16 may be used to determine the transmission ratio between the first motor 8 and the output shaft 16, wherein the transmission speed ratio is controlled by the speed of the second motor 10.

In another aspect, the second motor 10 not only continuously and steplessly adjusts the transmission ratio between the first motor 8 and the output shaft 16 but also adds power to the drive system 4 providing advantages over systems which vary the transmission ratio using a motor which does not add power to the drive system 4. The efficiency of a heat motor or engine, such as the internal combustion engine or turbine, often varies widely over its operating speed range. The present invention provides the ability to operate the heat engine, such as the internal combustion engine, at or near peak efficiency and/or power for a given set of output requirements so that the internal combustion engine operates within a narrow band of its performance curve. Thus, the first and second two motors 8, 10 produce and combine power at high levels of efficiency. The electric motor operates at relatively high efficiency throughout a broad speed range while the internal combustion engine operates at high efficiency and/or peak power within a relatively narrow speed range. As such, the electrical motor can be used to adjust the transmission ratio of the first motor 8 to the output shaft 16 so that the first motor 8 operates within a speed range for high efficiency and/or high power. The resulting drive system 4 is able to operate both motors at high efficiency and/or high power outputs while efficiently combining the power of both motors.

For example, when the first motor 8 is an internal combustion engine and the second motor 10 is an electric motor the internal combustion engine may be operated at or near a speed that can produce peak power even if the transmission output shaft 16 is not turning or is turning very slowly. Simultaneously, the power added by the second motor 10 is smoothly and efficiently added to the transmission output shaft 16 with the power from the first motor 8. This is the case when the present invention is being used to accelerate a high inertia load such as when a driver presses on the gas pedal of a vehicle from a standing start or when accelerating a high inertial load such as a crane boom.

The first and second motors 8, 10 may have the same or similar peak power ratings. In one embodiment, the first and second motors 8, 10 have a continuous or intermittent power rating and/or a peak power output which are within 20% of one another and more preferably within 10% of one another and most preferably within 5% of one another. Of course, even though the second motor 10 adds power to the system, in some configurations of the present invention the second motor 10 may have a much smaller continuous or intermittent peak power rating than the first motor 8. In either case, the second motor 10 would be used primarily to add power to the drive system 4 and continuously and steplessly vary the transmission ratio between the first motor 8 and the output shaft 16 thereby providing the efficiency benefits mentioned herein. The larger the second motor 10 is, up to the peak power of the first motor 8, the more power the second motor 10 is able to modulate from the first motor 8 through the transmission for some specific embodiments of the present invention.

The drive system 4 may also operate with only the first motor 8 driving the output shaft 16 when the control system 18 determines that operating conditions would benefit from isolating the second motor 10. This may be accomplished by applying the brake 32 to stop the ring gear 24 and stop and prevent rotation of the second motor 10. When the second motor 10 is an electric motor the brake stops the second motor 10 from rotating which prevents the second motor 10 from converting or absorbing energy. When the brake 32 engages the ring gear 24, only the first motor 8 drives the transmission output shaft 16 through a discrete speed ratio. When used in a hybrid vehicle, for example, the brake 32 may be applied to stop and mechanically isolate the second motor 10 when there are continuous low speed output shaft 16 requirements or high continuous external loads. In this manner, the present invention may be operated without using or storing energy in the power storage device 34. Alternatively, the first motor 8 may be locked to the output shaft 16 via the synchronizer 42. This also locks the second motor 10 to the output shaft 16 through a fixed speed ratio. In this mode of operation the second motor 10 may combine power serially to the drive system 4, may be used to generate electrical energy which is stored in the power storage device 34, or may convert no power in the system 4. This is particularly useful when large speed changes are not required on the output shaft 16 such as during cruising in a vehicle. Each of the modes of operation may be entered into or left as appropriate for the situation as determined by the control system, power requirements and user input.

As can be appreciated from various aspects and advantages of the present invention, the present invention provides the drive system 4 with the ability to operate the first motor 8 at or near peak power while also adding peak or near peak power from the second motor 10. When using the drive system 4 in a hybrid vehicle, for example, the present invention can provide high performance over a broad range of operating conditions to satisfy the performance demands of many car owners. Thus, the present invention may help increase adoption of hybrid vehicles to consumers who would otherwise not consider a hybrid vehicle since these vehicles often do not meet their performance demands. Increased adoption of hybrid vehicles over conventional internal combustion engines would lead to decreased emissions which would enhance the quality of the environment. Increased adoption of hybrid vehicles would also contribute to the conservation of energy resources and, in particular, non-renewable resources such as fossil fuels.

The present invention has been described in connection with the preferred embodiments, however, it can be appreciated that other suitable embodiments can be designed without departing from the scope of the invention. Furthermore, it is understood that all elements and features described for one of the preferred embodiments is equally applicable to the other embodiment or other systems within the scope of the present invention.

What is claimed is:

1. A method of varying a transmission ratio between a first motor and an output shaft using a second motor, comprising the steps of:
providing a first motor, a second motor, an output shaft and a planetary gear set including a ring gear, a sun gear and a carrier which supports at least one planet gear;
coupling the first motor, the second motor, and the output shaft each to one of the ring gear, sun gear and carrier;
producing a rotary output at the output shaft, wherein the transmission ratio between the first motor and the output shaft is varied by varying the speed of the second motor, wherein the speed of the output shaft increases when the speed of the second motor increases and the speed of the first motor is held constant, the producing step being carried out by varying the rotating speed of the second motor so that the first motor operates at a speed within a desired performance range, the producing step being carried out with the desired performance range being a range of less than 1000 rpm for the first motor while the power output increases 50% of a peak power output.

2. The method of claim 1, wherein:
the producing step is carried out with the transmission ratio being controlled by the second motor based upon an output torque demand on the engine.

3. The method of claim 1, wherein:
the providing step is carried out with the first motor being a heat engine and the second motor is an electric motor.

4. The method of claim 3, wherein:
the providing step is carried out with the heat engine being an internal combustion engine.

5. The method of claim 1, wherein:
the providing step is carried out with the first motor being coupled to the sun gear, the second motor being coupled to the ring gear, and the output shaft being coupled to the carrier.

6. The method of claim 1, wherein:
the providing step is carried out with the first motor being coupled to the sun gear, the second motor being coupled to the carrier and the output shaft being coupled to the ring gear.

7. The method of claim 1, wherein:
the providing step is carried out with a synchronizer for synchronizing the rotation of the first motor and the output shaft.

8. The method of claim 7, further comprising the step of:
synchronizing the rotation of the first motor, second motor and output shaft using the synchronizer.

9. The method of claim 1, wherein:
the producing step is carried out in a manner which operates the first motor within a desired performance range by varying the transmission ratio between the first motor and the output shaft.

10. The method of claim 1, wherein:
the producing step is carried out by combining a power of the first motor with a power of the second motor when the output shaft is initially not rotating.

11. The method of claim 1, further comprising:
synchronizing rotation of the first motor and the output shaft, wherein a power of the first motor is combined serially with the power of the second motor to provide power to the output shaft.

12. The method of claim 1, further comprising the step of:
generating electrical energy with the second motor, the second motor being an electrical motor;
storing the electrical energy in a power storage device.

13. A method of varying a transmission ratio between a first motor and an output shaft using a second motor, comprising the steps of:
providing a first motor, a second motor, an output shaft and a planetary gear set including a ring gear, a sun gear and a carrier which supports at least one planet gear;
coupling the first motor, the second motor, and the output shaft each to one of the ring gear, sun gear and carrier;
producing a rotary output at the output shaft, wherein the transmission ratio between the first motor and the output shaft is varied by varying the speed of the second motor, wherein the speed of the output shaft increases when the speed of the second motor increases and the speed of the first motor is held constant; and stopping the second motor to provide a fixed speed ratio between the first motor and the output shaft during a second mode of operation;

the producing step being carried out to vary the transmission ratio during a first mode of operation.

14. A method of combining the power of a first motor and a second motor, comprising the steps of:

providing an output shaft, a first motor, a second motor, a synchronizer, and a planetary gear set having a ring gear, a sun gear and a carrier having at least one planet gear, the first motor, second motor and output shaft being coupled to at least one of the ring gear, sun gear and carrier, the synchronizer synchronizing the rotation of the first motor and the output shaft;

varying the transmission ratio between the first motor and the output shaft by varying the speed of the second motor in a first mode of operation, wherein the speed of the output shaft increases when the speed of the second motor is increased while the speed of the first motor is constant, the varying step being carried out by varying the rotating speed of the second motor so that the first motor operates at a speed within a desired performance range, the varying step being carried out with the desired performance range being a range of less than 1000 rpm for the first motor while the power output increases 50% of a peak power output; and synchronizing the rotation of the first motor, second motor and output shaft using the synchronizer in a second mode of operation.

15. The method of claim 14, wherein:

the varying step is carried out with the transmission ratio being controlled by the second motor based upon an output torque demand.

16. The method of claim 14, wherein:

the providing step is carried out with the first motor being a heat engine and the second motor is an electric motor.

17. The method of claim 16, wherein:

the providing step is carried out with the heat engine being an internal combustion engine.

18. The method of claim 14, wherein:

the providing step is carried out with the first motor being coupled to the sun gear, the second motor being coupled to the ring gear, and the output shaft being coupled to the carrier.

19. The method of claim 14, wherein:

the providing step is carried out with the first motor being coupled to the sun gear, the second motor being coupled to the carrier and the output shaft being coupled to the ring gear.

20. The method of claim 14, wherein:

the varying step is carried out by combining a power of the first motor with a power of the second motor when the output shaft is initially not rotating.

21. A method of combining the power of a first motor and a second motor, comprising the steps of:

providing an output shaft, a first motor, a second motor, a synchronizer, and a planetary gear set having a ring gear, a sun gear and a carrier having at least one planet gear, the first motor, second motor and output shaft being coupled to at least one of the ring gear, sun gear and carrier, the synchronizer synchronizing the rotation of the first motor and the output shaft;

varying the transmission ratio between the first motor and the output shaft by varying the speed of the second motor in a first mode of operation, wherein the speed of the output shaft increases when the speed of the second motor is increased while the speed of the first motor is constant;

synchronizing the rotation of the first motor, second motor and output shaft using the synchronizer in a second mode of operation; and stopping the second motor to provide a fixed speed ratio between the first motor and the output shaft.

22. A method of varying a transmission ratio between a first motor and an output shaft using a second motor, comprising the steps of:

providing a first motor, a second motor, an output shaft and a planetary gear set including a ring gear, a sun gear and a carrier which supports at least one planet gear;

coupling the first motor, the second motor, and the output shaft each to one of the ring gear, sun gear and carrier;

producing rotary output at the output shaft in a first mode of operation and in a second mode of operation, the transmission ratio between the first motor and the output shaft being varied by varying the speed of the second motor in the first mode of operation, the second motor being stopped to provide a fixed speed ratio between the first motor and the output shaft when in the second mode of operation.

23. The method of claim 22, wherein:

the producing step is carried out with the speed of the output shaft increasing when the speed of the second motor increases and the speed of the first motor is held constant.

24. The method of claim 22, wherein:

the producing step is carried out with the transmission ratio being controlled by the second motor based upon an output torque demand on the engine when in the first mode of operation.

25. The method of claim 22, wherein:

the providing step is carried out with the first motor being a heat engine and the second motor is an electric motor.

26. The method of claim 22, wherein:

the providing step is carried out with the first motor being coupled to the sun gear, the second motor being coupled to the carrier and the output shaft being coupled to the ring gear.

27. The method of claim 22, further comprising:

the providing step is carried out with a synchronizer for synchronizing the rotation of the first motor and the output shaft.

28. The method of claim 22, further comprising the step of:

synchronizing the rotation of the first motor, second motor and output shaft using the synchronizer.

29. The method of claim 22, wherein:

the producing step is carried out in a manner which operates the first motor within a desired performance range by varying the transmission ratio between the first motor and the output shaft in the first mode of operation.

30. The method of claim 22, wherein:

the producing step is carried out by varying the rotating speed of the second motor so that the first motor operates at a speed within the desired performance range in the first mode of operation.

31. The method of claim 30, wherein:

the producing step is carried out with the desired performance range being a range of less than 2000 rpm for the first motor while the power output increases 50% of a peak power output.

32. The method of claim 30, wherein:
the producing step is carried out with the desired performance range being a range of less than 1000 rpm for the first motor while the power output increases 50% of a peak power output.

33. The method of claim 22, wherein:
the producing step is carried out by combining a power of the first motor with a power of the second motor when the output shaft is initially not rotating.

34. The method of claim 22, further comprising:
synchronizing rotation of first motor and the output shaft, wherein a power of the first motor is combined serially with the power of the second motor to provide power to the output shaft.

35. The method of claim 22, further comprising the step of:
generating electrical energy with the second motor, the second motor being an electrical motor;
storing the electrical energy in a power storage device.

36. A method of combining the power of a first motor and a second motor, comprising the steps of:
providing an output shaft, a first motor, a second motor, and a planetary gear set having a ring gear, a sun gear and a carrier having at least one planet gear, the first motor, the second motor and the output shaft each being coupled to at least one of the ring gear, sun gear and carrier;
varying the transmission ratio between the first motor and the output shaft by varying the speed of the second motor when in a first mode of operation, wherein the speed of the output shaft increases when the speed of the second motor is increased and the speed of the first motor is constant; and
stopping the second motor to provide a fixed speed ratio between the first motor and the output shaft in a second mode of operation.

37. The method of claim 36, wherein:
the producing step is carried out with the transmission ratio being controlled by the second motor based upon an output torque demand when in the first mode of operation.

38. The method of claim 36, wherein:
the providing step is carried out with the first motor being a heat engine and the second motor is an electric motor.

39. The method of claim 36, wherein:
the providing step is carried out with the first motor being coupled to the sun gear, the second motor being coupled to the carrier and the output shaft being coupled to the ring gear.

40. The method of claim 36, wherein:
the providing step is carried out with a synchronizer for synchronizing the rotation of the first motor and the output shaft.

41. The method of claim 40, further comprising the step of:
synchronizing the rotation of the first motor, second motor and output shaft using the synchronizer.

42. The method of claim 36, wherein:
the producing step is carried out in a manner which operates the first motor within a desired performance range by varying the transmission ratio between the first motor and the output shaft in the first mode of operation.

43. The method of claim 36, wherein:
the producing step is carried out by varying the rotating speed of the second motor so that the first motor operates at a speed within the desired performance range in the first mode of operation.

44. The method of claim 43, wherein:
the producing step is carried out with the desired performance range being a range of less than 2000 rpm for the first motor while the power output increases 50% of a peak power output.

45. The method of claim 43, wherein:
the producing step is carried out with the desired performance range being a range of less than 1000 rpm for the first motor while the power output increases 50% of a peak power output.

46. The method of claim 36, wherein:
the producing step is carried out by combining a power of the first motor with a power of the second motor when the output shaft is initially not rotating.

* * * * *